United States Patent [19]

Tokuhara et al.

[11] Patent Number: 4,624,555
[45] Date of Patent: Nov. 25, 1986

[54] SLIT EXPOSURE PROJECTION DEVICE

[75] Inventors: Mitsuhiro Tokuhara, Chigasaki; Hiroshi Ogawa, Yokohama, both of Japan

[73] Assignee: Canon Kabushiki Kaisha, Tokyo, Japan

[21] Appl. No.: 775,263

[22] Filed: Sep. 12, 1985

[51] Int. Cl.⁴ .............................................. G03B 27/72
[52] U.S. Cl. ...................................... 355/71; 350/450; 355/50
[58] Field of Search ................... 355/8, 48, 50, 51, 67, 355/71, 84, 1; 350/448, 449, 450

[56] References Cited

U.S. PATENT DOCUMENTS

| | | | |
|---|---|---|---|
| 3,504,960 | 4/1970 | Harper | 350/450 |
| 3,580,675 | 5/1971 | Hieber | 355/50 |
| 4,275,962 | 6/1981 | Midorikawa et al. | 355/1 |

Primary Examiner—Richard A. Wintercorn
Attorney, Agent, or Firm—Fitzpatrick, Cella, Harper & Scinto

[57] ABSTRACT

A slit exposure projection device having a projection optical system and/or an aperture stop designed such that the pupil of the projection optical system in the longitudinal direction of the slit is large relative to the pupil in the lateral direction of the slit.

20 Claims, 14 Drawing Figures

FIG. 6
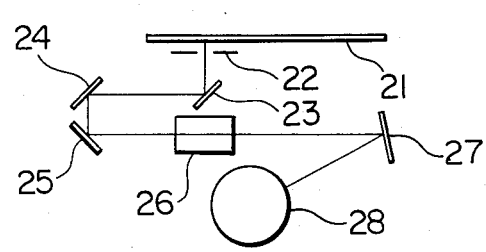
FIG. 7
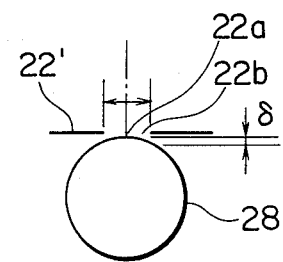
FIG. 8
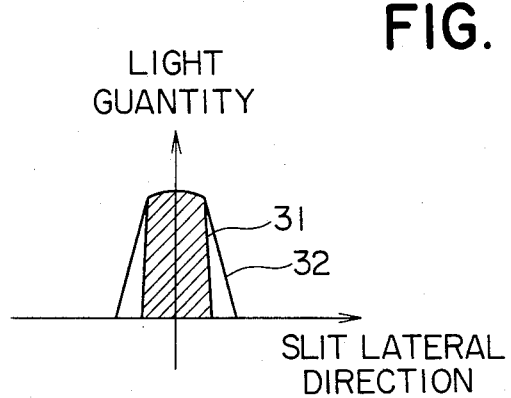
FIG. 9A   FIG. 9B
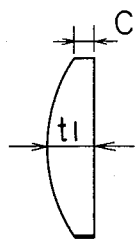 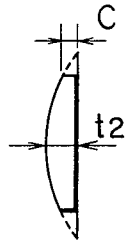
FIG. 10
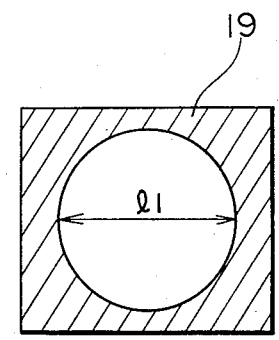

SLIT EXPOSURE PROJECTION DEVICE

BACKGROUND OF THE INVENTION

1. Field of the Invention

The present invention relates to a slit exposure projection device used in a copying machine or the like.

2. Description of the Prior Art

In the past, a single lens or compound eye condensing light transmitting medium has been used as a focusing optical system of a copying machine. The single lens is a conventional transmissive lens or mirror type lens which may be a fixed focus lens or variable focus lens. It is of a circular shape and the aperture diaphragm (entrance pupil and exit pupil) thereof is also circular.

In recent years, size reduction and high performance of the copying machine have been desired. U.S. Pat. No. 3,504,960 shows a slit exposure copying machine which uses a parallel stop external to of a conventional focusing lens having a round pupil to improve a aberration in the lateral direction (sagittal direction) of the exposure slit. This technique improves the performance of the focusing lens but does not reduce the size of the device and the cost is high because of arrangement of the stop external to the focusing lens. Further, because of the arrangement to the stop external of the lens, a half shade image of a light flux on the photo-receiving plane is complex.

Photograph Industry, 41(81) pages 115–120 (1983) discloses an oval lens having a truncated spherical lens. Since the field angle necessary in the lateral direction of the exposure slit (short direction of the slit) is smaller than the field angle necessary in a longitudinal direction of the slit (long direction of the slit), if a circular lens about an optical axis is used, a light flux directed from the pupil of the lens to a photo-receiving plane through the slit does not pass through the area of the lens away from the optical axis of the lens in the slit lateral direction. This lens area is cut off to form the oval lens as shown in the photograph Industry reference. Accordingly, the pupil of this lens is circular and the light flux transmitted through the pupil is not eclipsed by the lens and reaches the photo-receiving plane.

However, the prior art device still has a problem in providing a high performance slit exposure projection device which allows size reduction and cost reduction of the device while maintaining sufficient lens performance and F-number.

SUMMARY OF THE INVENTION

It is an object of the present invention to provide a slit exposure projection device which assures sufficient lens performance and F-number.

It is another object of the present invention to provide a high performance slit exposure projection device which is compact and yet has an excellent aberration characteristic.

In order to achieve the above objects, the slit exposure projection device of the present invention sets a projection optical system and/or an aperture stop such that the pupil size of the optical system in a longitudinal direction of a slit is large relative to the pupil size in a lateral direction of the slit. With this setting, the aberration characteristic of the optical system in the lateral direction of the slit is excellent and a reduction of light flux can be compensated for by a sufficient amount of a light flux in the longitudinal direction of the slit.

BRIEF DESCRIPTION OF THE DRAWINGS

FIGS. 6, 7 and 8 show one embodiment of a copying machine in accordance with the present invention, FIGS. 9A and 9B illustrate reduced lens size characteristics of the present invention, and FIG. 10 shows a modification of an aperture stop.

DETAILED DESCRIPTION OF THE PREFERRED EMBODIMENTS

Figure 1A:
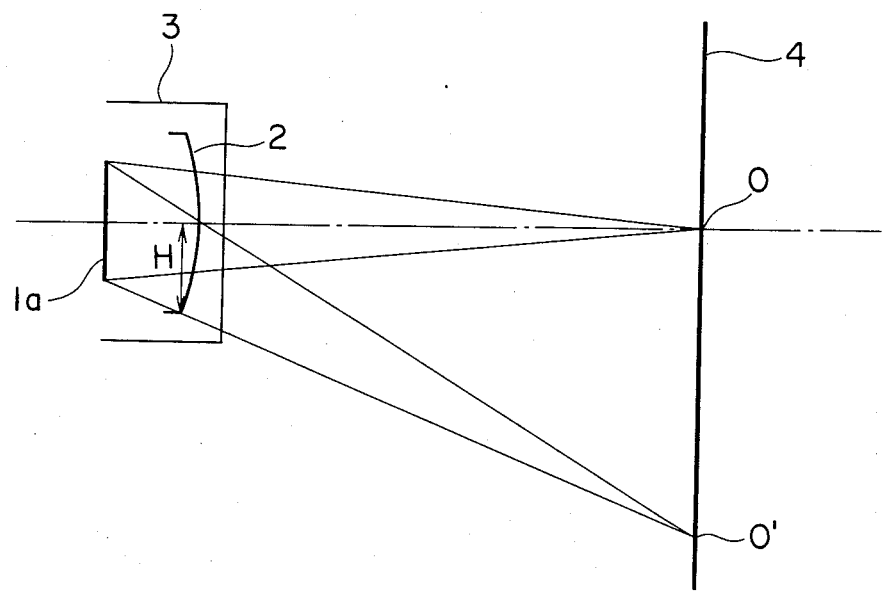
FIGS. 1A and 1B illustrate the basic construction of the present device.
Figure 1B:
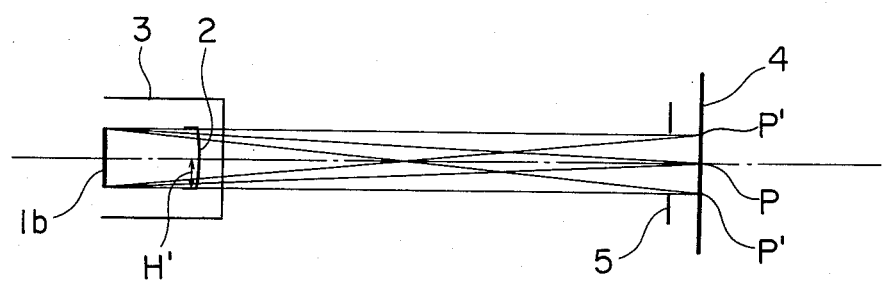

FIGS. 1A and 1B show a basic construction of a slit exposure projection device of the present invention. FIG. 1A shows a sectional view of a projection lens in a plane in the longitudinal direction of a slit containing an optical axis of the projection lens, and a light path, and FIG. 1B shows a sectional view of the projection lens in a plane in the lateral direction of the slit containing the optical axis of the projection lens. Numerals 1a and 1b denote exit pupils of the projection lens, numeral 2 denotes a plane of the projection lens closest to a photo-receiving plane, numeral 3 denotes a lens tube and numeral 4 denotes the photo-receiving plane which corresponds to a photoconductor plane in a copying machine. For example, a light flux from a document sheet (not shown) is condensed by the projection lens, exits from the exit pupils 1a and 1b of the projection lens and is focused onto the photo-receiving plane 4. Numeral 5 denotes an exposure slit.

As shown in FIG. 1A, there are various light fluxes between a light flux directed to a point 0 on the optical axis and a light flux directed to a maximum image field point 0' off the optical axis, in the longitudinal direction of the slit. The size of the lens in the longitudinal direction of the slit is determined by the light flux directed to the off-axis point 0'. The height of the lens plane 2 required under this condition is represented by H.

Figure 3:
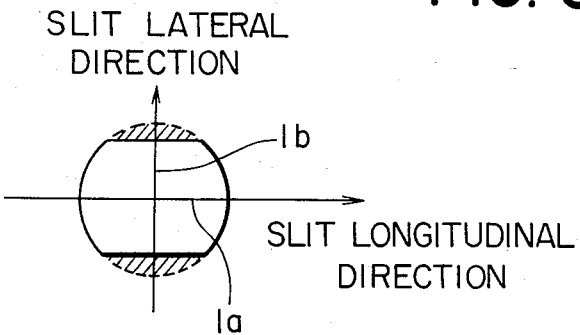
FIG. 3 is a front view of a pupil of the device shown in FIGS. 1A and 1B.

On the other hand, in the lateral direction of the slit shown in FIG. 1B, the exit pupils in the lateral direction of the slits are cut away depending on the eclipse by the lens. The periphery of the lens in the lateral direction of the slit is cut off such that the exit pupil 1b in the section of FIG. 1 is smaller than the exit pupil 1a in the section of FIG. 1A. Points p' of light fluxes which connect the point p on the optical axis and ends of the slit 5 are shown in FIG. 1B. The lateral direction of the slit corresponds to a scan direction in the copying machine and the height of the end lens plane 2 from the optical axis is represented by H'. The height H' is much smaller than the height H. A view of the end lens plane 2 as viewed from the photo-receiving plane 4 is shown in FIG. 3. Hatched areas in FIG. 3 show cut-off areas of the pupil due to the cut-off of the periphery of the lens in the lateral direction of the slit.

In the longitudinal direction of the slit, the pupil is large enough to transmit sufficient light flux therethrough, and in the lateral direction of the slit, the top and the bottom of the circle are cut off in parallel to the longitudinal direction of the slit. As a result, the height of the lens in the lateral direction of the slit is reduced and the thickness of the lens tube 3 in the lateral direction of the slit can be substantially reduced.

Figure 2:
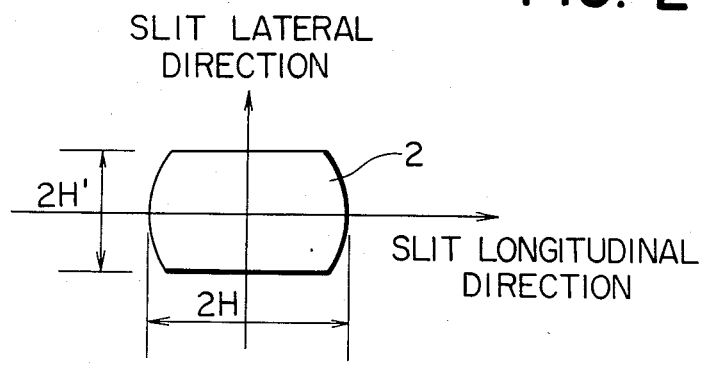
FIG. 2 is a front view of a lens of the device shown in FIGS. 1A and 1B.
Figure 4:
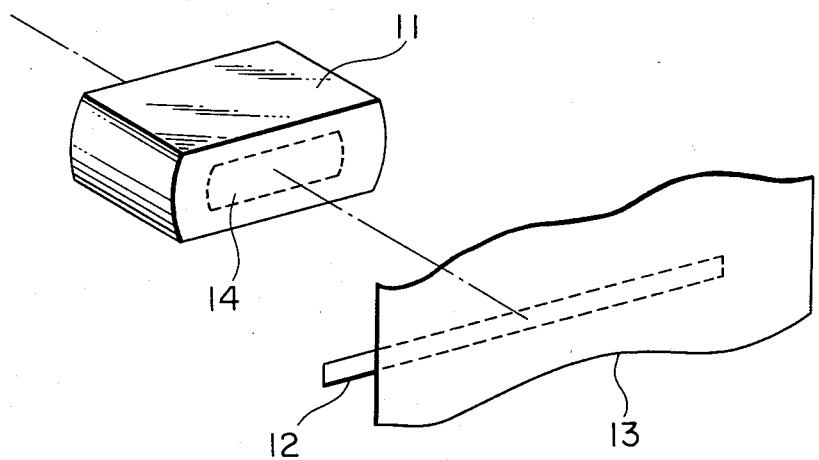
FIG. 4 is a schematic perspective view of the device shown in FIGS. 1A and 1B.

FIG. 4 is a schematic perspective view of the projection lens system of the projection device of the present invention shown in FIGS. 1 and 2. Numeral 11 denotes the projection lens, numeral 12 denotes the exposure slit, numeral 13 denotes a photoconductor or document sheet, and numeral 14 denotes a pupil of the lens 11. The projection lens 11 has its top and bottom cut off in parallel to the longitudinal direction of the slit. The shape of the lens 11 defines the shape of the pupil 14 of lens. Where the aperture stop is provided, the shape thereof may comply with the lens mentioned immediately above or may be of a circular shape or the like which is large enough in its diameter as determined with reference to the longitudinal dimension of the slit. Thus, the lens is much thinner than the prior art circular lens.

Figure 5A:
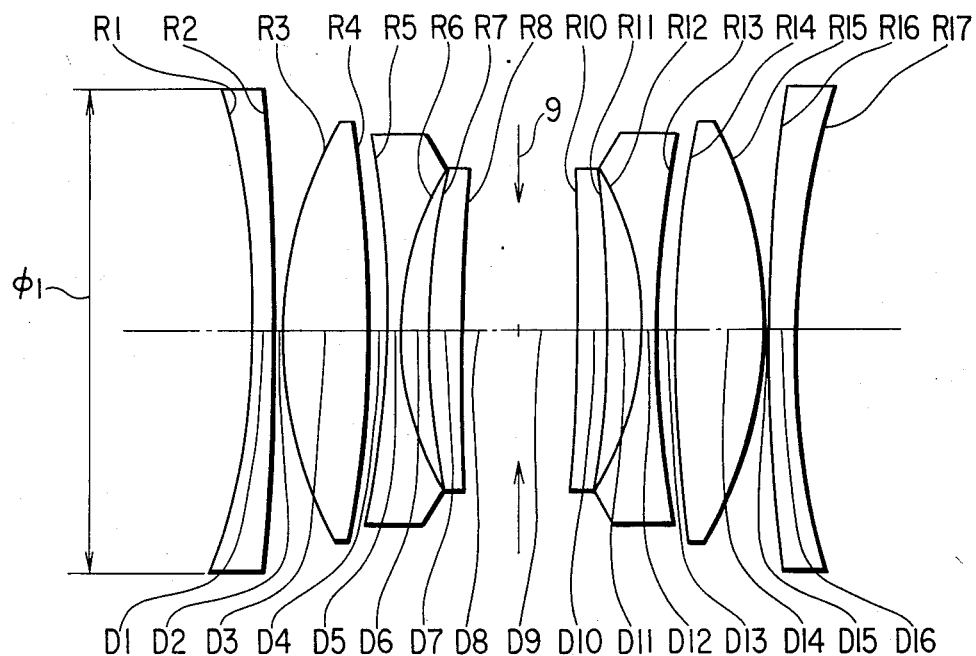
FIGS. 5A, 5B and 5C show a lens system and a stop used in the present device.
Figure 5B:
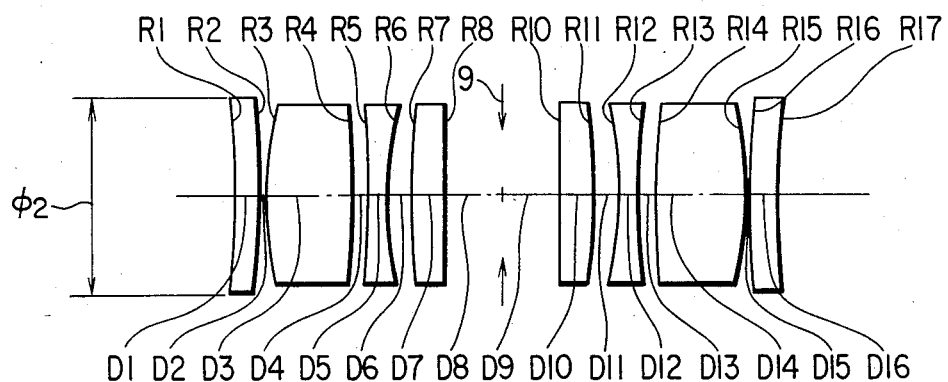

One example of a rectangular projection lens used in the slit exposure projection device of the present invention are shown in FIGS. 5A and 5B. FIG. 5A shows a sectional view of the projection lens in the longitudinal direction of the slit, and FIG. 5B shows a sectional view of the focusing lens in the lateral direction of the slit. This is laterally symmetric about the stop 9 and is a zoom lens whose magnification is variable by changing distances D2 and D15, and D8 and D9. The diameter $\phi_1$ of the outermost (leftmost) lens in the longitudinal direction of the slit is 72 mm and the diameter $\phi_2$ in the lateral direction of the slit is 27.5 mm.

Lens data

The distance to an object image is 891.52 mm, an equivalent F-number being 6.6. For unity magnification, the distance from the first plane (plane facing the object) of the lens to the object, and the distance from the end plane (plane facing the image) of the lens to the image plane are 407 mm, respectively, in a unity magnification, the projection lens is moved toward the image plane (rightward) by 96 mm in a reduction mode ($\times 0.64$) (i.e. from the position in the one-to-one magnification mode), and the projection lens is moved toward the object plane (leftward) by 87.7 mm in the enlargement mode ($\times 1.5$).

| | |
|---|---|
| $R_1 = R_{17} = -123.28$ | $D_1 = D_{16} = 3.31$ |
| $R_2 = R_{16} = -361.83$ | $D_2 = D_{15} = $ variable |
| $R_3 = R_{15} = 64.43$ | $D_3 = D_{14} = 12.73$ |
| $R_4 = R_{14} = -180.59$ | $D_4 = D_{13} = 2.65$ |
| $R_5 = R_{13} = -157.42$ | $D_5 = D_{12} = 2.97$ |
| $R_6 = R_{12} = 50.62$ | $D_6 = D_{11} = 3.43$ |
| $R_7 = R_{11} = 118.27$ | $D_7 = D_{10} = 4.86$ |
| $R_8 = R_{10} = 1383.30$ | $D_8 = D_9 = $ variable |
| $N_1 = N_8 = 1.516$ | $\nu_1 d = \nu_8 d = 64.1$ |
| $N_2 = N_7 = 1.717$ | $\nu_2 d = \nu_7 d = 47.9$ |
| $N_3 = N_6 = 1.626$ | $\nu_3 d = \nu_6 d = 35.7$ |
| $N_4 = N_5 = 1.723$ | $\nu_4 d = \nu_5 d = 38.0$ |

| Magnification | D2(D15) | D8(D9) | Focal distance of lens |
|---|---|---|---|
| 1.5 × | 4.8 | 4.3 | 210.3 |
| 1 × | 0.7 | 8.4 | 220.0 |
| 0.64 × | 5.8 | 3.3 | 208.0 | where Ri is a radius of curvature of an i-th plane counted from the incident plane (plane facing the object), Di is an axial thickness or axial air gap between the i-th plane and the (i+1)th plane, Ni is a refractive index of the i-th lens counted from the incident plane and $\nu$id is an abbe number of the i-th lens.

Figure 5C:
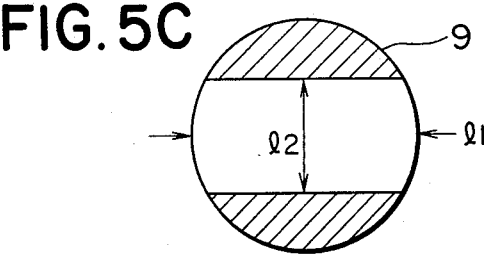

The shape of the stop 9 of the projection lens is shown in FIG. 5C. A diameter $l_1$ of an aperture in the longitudinal direction of the slit is 37.7 mm, and a diameter $l_2$ in the lateral direction of the slit is 19 mm. The shape of the exit pupil is analogous to the shape of the stop 9, and $l_1 = 43.0$ mm and $l_2 = 21.6$ mm in the one-to-one magnification ($\times 1$) mode. The size of the exit pupil changes with zooming but the shape is analogous. The F-number of the projection lens is 11 in the lateral direction of the slit and 5.0 in the longitudinal direction of the slit. Accordingly, the equivalent F-number to a lens having a conventional circular pupil is 6.6.

FIG. 6 shows an embodiment of the slit exposure projection device of the present invention applied to a copying machine. Numeral 21 denotes a platen glass on which a document sheet is mounted, numeral 22 denotes an exposure slit, and numerals 23, 24 and 25 denote scan mirrors moved along the platen glass. The mirror 23 and the mirrors 24 and 25 are moved at a velocity ratio of 2. Numeral 26 denotes a projection lens which is a rectangular flat lens having the peripheries thereof cut off in the lateral direction of the slit, numeral 27 denotes a fixed mirror and numeral 28 denotes a photoconductor drum. Elements for visualizing a latent image formed on the drum are not shown. In this arrangement, by the use of the rectangular flat lens, the space of the lens in the direction of the height, that is in a direction normal to the platen glass, can be significantly reduced from the space which would be occupied by the conventional circular lens. Accordingly, the size of the copying machine can be reduced. The widths of the mirrors of the copying machine can also be reduced in the lateral direction of the slit, and the size of the optical system and hence the size of the device can be reduced.

In recent years, because of the demand for size reduction of the copying machine and the easiness of separation of sheets, the diameter of the photoconductor drum 28 has been reduced. As a result, the radius of curvature of the drum is reduced (as shown in FIG. 7), 7 and the difference $\delta$ between light paths in the optical axis direction at a center 22a of the slit and at a periphery 22b of the slit (numeral 22' denotes an image of the slit 22 by the optical system 23-27) increases. Accordingly, even if the image is focused at the center of the slit, it is defocused at the periphery of the slit because of the difference between the light paths. Therefore, the focal depth of the projection lens 26 in the section in the lateral direction of the slit (synchronization direction to the rotating drum) containing the optical axis is preferably large. This is also true in the section in the longitudinal direction of the slit (non-synchronization direction) containing the optical axis, and the depth in the synchronization direction (saggital direction) in which synchronization is present between the movement of the document sheet table 21 or the movement of the moving mirrors and the rotation of the drum 28 is preferably large. In this connection, in the present invention, since the peripheries of the lens are cut off to flatten the circular pupil, the aberration characteristic is excellent and the focal depth is large.

By limiting the pupil in accordance with the present invention, the light intensity on the photoconductor drum distributes as shown by 31 in FIG. 8 and the light intensity distribution approaches the slit width. In FIG. 8, an ordinate represents the light intensity and an abscissa represents the distance in the lateral direction of the slit. If the pupil is circular, a half shade area expands as shown by line 32 and the width of the light intensity distribution on the drum is larger than the slit width. For the drum having the small diameter, the difference δ of the optical path can be reduced in the present invention because the width of the light intensity distribution on the drum is not expanded relative to the slit width. In the shaded area, the affect of the drum diameter is minimum and the affect of the vibration of the drum and others is small because the light intensity distribution is maximum at the center. When a zoom lens is used as the projection lens, a difference between half shade light intensities in the enlargement mode and in the reduction mode is smaller than that obtained when the circular pupil is used.

In the present invention, the thickness of the projection lens can be reduced for the following reason. When the lens is mounted into a lens tube, a marginal thickness of the lens for engagement with the lens tube to be supported thereby must have a certain thickness. As shown in FIG. 9A, the thickness of the lens at the center of a circular lens, necessary for the required marginal thickness C is given by $t_1$. In the present invention, since the portions of the lens are cut off in the lateral direction of the slit, the marginal thickness C is given by the remaining portions as shown in FIG. 9B and the lens can be supported even if the marginal thickness in another area is zero. If the radii of curvature of the lenses of FIGS. 9A and 9B are equal, it is apparent that the lens thickness $t_2$ is smaller than $t_1$. Since the lens is truncated, it is lighter than the circular lens. If it is manufactured by glass molding or plastic molding, the cost is low and the weight is light.

In the slit exposure projection device of the present invention, the opposite side portions of the projection lens are cut off and the circular pupil is likewise cut off parallel to the longitudinal direction of the slit. Thus, the following advantages are offered.

(1) The height of the lens in the lateral direction of the slit is reduced and the size of the optical system is reduced. This leads to reduction of the height of a copying machine and reduction of the effective width of a mirror of the copying machine.

(2) Quantity of optical material is reduced and cost and weight of the device are reduced. When the lens is manufactured by glass molding or plastic molding, the quantity of the optical material is reduced and the thickness of the lens can also be reduced.

(3) The aberration characteristic of the lens in the lateral direction of the slit (saggital direction) is excellent.

(4) The focal depth in the lateral direction of the slit is high. This leads to an improvement of the copy resolution power in a copying machine which uses a small diameter drum.

(5) The half shade generated by the slit is small. This has the same effect as the reduction of the slit width. In the copying machine, this improves the synchronization between the drum rotation and the scan.

(6) Since the light intensity distribution in the lateral direction of the slit is highest at the top of the drum, the copy resolving power of the copying machine is improved. This also leads to the improvement of the copy resolving power of the small diameter drum.

In the present embodiment, the portions of the focusing optical system are cut off so that the size of the pupil in the lateral direction of the slit is sufficiently smaller than the size of the pupil in the longitudinal direction of the slit. Alternatively, only the aperture stop may be shaped as shown in FIG. 5C and the focusing optical system may not be truncated but left circular, or the focusing optical system may be truncated and the stop may be left circular. The size of the pupil in the lateral direction of the slit may be determined by the cut-off of the focusing optical system, and the size of the pupil in the longitudinal direction of the slit may be defined by a circular stop 19 having a diameter $l_1$ as shown in FIG. 10.

In essence, the pupil shape is determined by the focusing system and the stop. The advantages (3) to (6) described above are always attained.

The present invention is applicable to not only the spherical focusing optical system shown in FIG. 5A but also to a non-spherical focusing optical system.

What we claim is:

1. A slit exposure projection device comprising:
   means for confining a light flux reaching a photo-receiving plane to a slit shape; and
   a focusing optical system having a pupil which is large in a longitudinal direction of the slit so that a quantity of the light flux is sufficiently large, and which is smaller in a lateral direction of the slit than in the longitudinal direction of the slit, said focusing optical system focusing the light flux onto said photo-receiving plane.

2. A slit exposure projection device according to claim 1, wherein said focusing optical system is of a circular shape having peripheries thereof cut off in the lateral direction of the slit.

3. A slit exposure projection device according to claim 1, wherein the size of the pupil is defined only by said focusing optical system.

4. A slit exposure projection device according to claim 1, further comprising an aperture stop mounted in said focusing optical system.

5. A slit exposure projection device according to claim 4, wherein the size of the pupil is defined by said focusing optical system and said aperture stop.

6. A slit exposure projection device according to claim 5, wherein said focusing optical system is of a circular shape having peripheries thereof cut off in the lateral direction of the slit, and said aperture stop defines the size of the pupil in the longitudinal direction of the slit.

7. A slit exposure projection device according to claim 4, wherein the size of the pupil is defined only by said aperture stop, and said aperture stop is of a circular shape having peripheries thereof cut off in the lateral direction of the slit.

8. A slit exposure projection device according to claim 4, wherein said focusing optical system is symmetric in configuration with respect to said aperture stop.

9. A slit exposure projection device according to claim 4, wherein said focusing optical system is a zoom lens having a variable magnification function.

10. A slit exposure projection device according to claim 2, wherein said focusing optical system is manufactured by molding.

11. A copying machine comprising:
    a photosensitive medium;

means for confining a light flux reaching from a document sheet to the photosensitive medium to a slit shape;

a focusing optical system for focusing an image of the document sheet onto said photosensitive medium, said system having a pupil which is large in a longitudinal direction of the slit so that a quantity of the light flux is sufficiently large, and which is smaller in a lateral direction of the slit than in the longitudinal direction of the slit, said focusing optical system focusing the light flux onto said photo-receiving plane; and means for scanning the document sheet.

12. A copying machine according to claim 11, wherein said focusing optical system is of a circular shape having peripheries thereof cut off in the lateral direction of the slit.

13. A copying machine according to claim 11, wherein the size of the pupil is defined only by said focusing optical system.

14. A copying machine according to claim 11, further comprising an aperture stop mounted in said focusing optical system.

15. A copying machine according to claim 14, wherein the size of the pupil is defined by said focusing optical system and said aperture stop.

16. A copying machine according to claim 15, wherein said focusing optical system is of a circular shape having peripheries thereof cut off in the lateral direction of the slit, and said aperture stop defines the size of the pupil in the longitudinal direction of the slit.

17. A copying machine according to claim 14, wherein the size of the pupil is defined only by said aperture stop, and said aperture stop is of a circular shape having peripheries thereof cut off in the lateral direction of the slit.

18. A copying machine according to claim 14, wherein said focusing optical system is symmetric in configuration with respect to said aperture stop.

19. A copying machine according to claim 14, wherein said focusing optical system is a zoom lens having a variable magnification function.

20. A copying machine according to claim 2, wherein said focusing optical system is manufactured by molding.

* * * * *